United States Patent Office 3,803,227
Patented Apr. 9, 1974

3,803,227
PESTICIDAL 1-ARYL, 3-ALKANOYL THIOUREAS
Alfred Joos and Walter Wirtz, Darmstadt, West Germany, assignors to Merck Patent Gesellschaft mit beschrankter Haftung, Darmstadt, Germany
No Drawing. Filed Dec. 6, 1971, Ser. No. 205,327
Claims priority, application West Germany, Dec. 5, 1970,
P 20 59 872.5
Int. Cl. C07c 157/12
U.S. Cl. 260—552 R                                    18 Claims

ABSTRACT OF THE DISCLOSURE

Thioureas of the general Formula

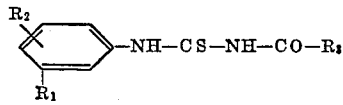

wherein $R_1$ is halogen, CN, $CF_3$, $CCl_3$, $SR_3$, $SOR_3$, or $SO_2R_3$; $R_2$ is H, halogen, or $NO_2$; and $R_3$ is alkyl of 1-6 carbon atoms, are valuable effective agents for pest control which exhibit very good ingestive and contact insecticidal properties, as well as fungicidal and herbicidal activity.

BACKGROUND OF THE INVENTION

Field of the invention

This invention relates to thiourea compounds and to methods of preparing and using them. More particularly, this invention relates to thiourea compounds which exhibit pesticidal activity, to methods of preparing such compounds, and to methods of pest control using such compounds as effective insecticidal, herbicidal or fungicidal agents.

Description of the prior art

Thiourea compounds of the formula

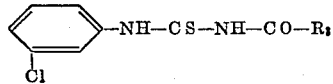

wherein $R_3$ is a lower alkyl group are known intermediates for the preparation of pharmaceuticals, as taught in Pharmazie, vol. 23 (1968), pp. 484–490, and in German AS 1,230,011. However, the prior art has not recognized that such compounds exhibit fungicidal and herbicidal properties, nor that they have excellent ingestive and contact insecticidal properties. Furthermore, it has not heretofore been known that these valuable properties are obtained to an even greater extent in other thioureas.

SUMMARY OF THE INVENTION

Accordingly, it is an object of this invention to provide novel thiourea compounds and methods of preparing them.

Another object of this invention is to provide compositions having a thiourea compound as an effective insecticidal, herbicidal or fungicidal agent.

A further object of the present invention is to provide methods of killing insects, plants and fungi.

An additional object of the present invention is to provide insecticides which are effective against insect populations resistant to other pest control agents.

Briefly, these and other objects, features and advantages of the present invention are attained in one aspect thereof by providing thioureas of the general Formula I

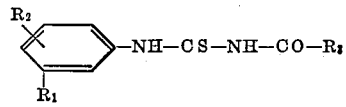

wherein $R_1$ is halogen, CN, $CF_3$, $CCl_3$, $SR_3$, $SOR_3$, or $SO_2R_3$; $R_2$ is H, halogen, or $NO_2$; and $R_3$ is alkyl of 1–6 carbon atoms. They are valuable effective agents for pest control which exhibit very good ingestive and contact insecticidal properties, as well as fungicidal and herbicidal activity. More particularly, novel thioureas of the above formula further limited by the condition that, when $R_1$ is chlorine, $R_2$ is other than hydrogen, are provided herein as effective insecticidal, herbicidal or fungicidal agents, together with methods for the preparation and use of these compounds.

As a halogen substituent in $R_1$ or $R_2$, any of the halogens fluorine, chlorine, bromine and iodine may be used; when both $R_1$ and $R_2$ are halogen, the halogens may be the same or different. Preferred thioureas of the present invention having a halogen substituent are those wherein the halogen is chlorine or bromine, since the starting materials for their production are readily available. Examples of thioureas of the present invention having at least one halogen substituent include but are not limited to the following compounds:

N-(3-chloro-4-nitrophenyl)-N'-acetyl thiourea,
N-(2-nitro-3-fluorophenyl)-N'-propionyl thiourea,
N-(3,4-dichlorophenyl)-N'-acetyl thiourea,
N-(3,4-dichlorophenyl)-N'-butyryl thiourea,
N-(3-trifluoromethyl-4-fluorophenyl)-N'-isobutyryl
  thiourea,
N-(3-trifluoromethyl-6-chlorophenyl)-N'-trimethylacetyl
  thiourea,
N-(3-cyano-6-chlorophenyl)-N'-butyryl thiourea,
N-(3-chloro-4-bromophenyl)-N'-isobutyryl thiourea.

Where $R_1$ is alkylmercapto, alkylsulfinyl or alkylsulfonyl, the alkyl groups contained therein can be of 1–6 carbon atoms, preferably 1–3 carbon atoms. Preferred groups among the above include methylmercapto, ethylmercapto, isopropylmercapto, methylsulfinyl, ethylsulfinyl, methylsulfonyl, ethylsulfonyl and isopropylsulfonyl groups. Especially preferred are compounds of Formula I wherein $R_1$ is cyano; most preferred are those wherein $R_1$ is trifluoromethyl or trichloromethyl. Examples of thioureas of the present invention wherein $R_1$ is an alkylsulfonyl, cyano, trifluoromethyl or trichloromethyl include but are not limited to the following:

N-(3-trifluoromethyl-5-nitrophenyl)-N'-acetyl
  thiourea,
N-(3-trifluoromethylphenyl)-N'-diethylacetyl thiourea,
N-(3-cyano-4-bromophenyl)-N'-trimethylacetyl
  thiourea,
N-(3-trifluoromethylphenyl)-N'-caproyl thiourea,
N-(3-trichloromethylphenyl)-N'-diethylacetyl
  thiourea,
N-(3-trifluoromethylphenyl)-N'-α,α-diethylpropionyl
  thiourea,
N-(3-cyano-5-chlorophenyl)-N'-butyryl thiourea,
N-(3-trichloromethyl-4-chlorophenyl)-N'-isobutyryl
  thiourea.

When $R_2$ in the compounds of Formula I is halogen or $NO_2$, it can occupy any of the free positions of the phenyl nucleus. However, these groups are preferably adjacent to $R_1$, i.e., in the 2- or 4-position on the phenyl nucleus.

$R_3$ in the compounds of Formula I is an alkyl group of 1–6 carbon atoms, preferably of 1–4 carbon atoms, such as methyl, ethyl, n-propyl, isopropyl, 1-n-butyl, 2-n-butyl, isobutyl, tert.-butyl, n-amyl, isoamyl, neopentyl, n-hexyl or isohexyl.

Compounds of Formula I wherein $R_3$ is an alkyl group of 1–4 carbon atoms, especially isopropyl or tert.-butyl, are particularly preferred for certain applications due to their high activity as insecticides.

Thioureas of the present invention can be prepared by various methods, such as reacting an acyl mustard oil with an aniline; treating an aromatic thiourea with an acylating agent; or reacting thiophosgene with carboxylic acid amides followed by reacting the product thus obtained with an aniline.

In preparing the compounds of Formula I by reacting an acyl mustard oil with an aniline, an acyl mustard oil of the general Formula II $$R_3\text{---CO---N=C=S} \qquad (II)$$

is reacted with an aniline of the general Formula III

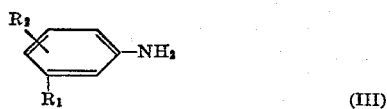

(III)

wherein $R_1$, $R_2$ and $R_3$ have the values given above.

This reaction is preferably conducted in an inert organic solvent. Suitable solvents in which good yields are obtained include but are not limited to alcohols, e.g., methanol, ethanol, isopropanol and butanol; ketones, e.g., acetone, butanone, 2-pentanone, 3-pentanone and 4-methyl-2-pentanone; ethers, e.g., diethyl ether, tetrahydrofuran and dioxane; carboxylic acid derivatives, e.g., ethyl acetate, butyl acetate, formamide and dimethylformamide; hydrocarbon solvents, e.g., petroleum ether, hexane, cyclohexane, benzene, toluene and xylene; dimethyl sulfoxide; and acetonitrile. The solvents may be used either alone or in admixture. Suitable reaction temperatures generally range between 0° C. and the boiling temperature of the reaction mixture or the lowest-boiling component thereof. Preferably, the acyl mustard oils of Formula II are reacted with approximately equimolar amounts of the anilines of Formula III in boiling benzene. The reaction mixture is usually worked up by distilling off the solvent, optionally under reduced pressure, during which step the desired thiourea is usually crystallized, optionally after subsequent cooling to 0–10° C. If the reaction of the acyl mustard oil with the aniline is conducted in a water-miscible solvent, the reaction mixture can optionally be stirred into a large excess of ice water, causing the thiourea product to separate, either in the form of a fine-crystalline precipitate or as an oil.

The acyl mustard oils employed as the starting material of this reaction are conventional or may be produced analogously to the conventional acyl mustard oils, such as by reacting carboxylic acid halogenides with an alkali or ammonium thiocyanate. It has been found unnecessary to isolate the acyl mustard oils from the thus-obtained reaction mixtures; these reaction mixtures containing the acyl mustard oils give good yields when reacted directly with the anilines of Formula III to produce the thioureas of Formula I.

When preparing the thioureas of Formula I by reacting an aromatic thiourea with an acylating agent, a thiourea of the general Formula IV

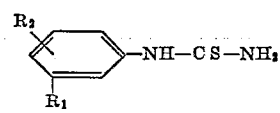

(IV)

wherein $R_1$ and $R_2$ have the values given above, is reacted with an acylating agent to introduce the residue $R_3$---CO onto the primary amino group. The best acylating agents are carboxylic acid halogenides or carboxylic acid anhydrides corresponding to the residue $R_3$---CO, wherein $R_3$ has the value given above. Since one of the two reactants is in the liquid phase, acylation can be effected in the absence of an added solvent. If desired, a solvent which is inert with respect to the reactants under acylation conditions may be used. Suitable solvents include but are not limited to ethers, e.g., diethyl ethyl, tetrahydrofuran and dioxane; hydrocarbons, e.g., petroleum ether, benzene, toluene and xylene; dimethylformamide; acetonitrile; or admixtures of the above. The addition of a Lewis base, e.g., pyridine or triethylamine, is often advantageous, especially in acylation reactions using carboxylic acid halogenides.

As previously indicated, thioureas of this invention may also be prepared by reacting thiophosgene with carboxylic acid aniline. In this method, carboxylic acid amides of the general Formula V $$R_3\text{---CO---NH}_2 \qquad (V)$$

wherein $R_3$ has the value given above, are reacted with thiophosgene, and the reaction product obtained is then reacted with an aniline of Formula III. The thiocarbamic acid chloride $R_3$---CO---NH---CS---Cl which is produced as an intermediate during this process need not be isolated; preferably it is further processed by adding the aniline in situ and subsequently heating to form the desired thiourea. Both steps of this reaction can be conducted in either the presence or absence of additional solvent. Suitable solvents which may be used include but are not limited to chloroform, carbon tetrachloride, benzene, toluene, xylene, chlorobenzene, dioxane or mixtures thereof. When using a solvent, it is particularly advantageous to employ an anhydrous or nearly anhydrous solvent. Reaction temperatures are not critical except within broad limits, and are advantageously between room temperature and the boiling point of the reaction mixture or the lowest-boiling component thereof. When reacting a carboxylic acid amide with thiophosgene, the use of elevated pressure has occasionally proven to be advantageous.

The compounds of Formula I are valuable effective agents for pest control. In particular, they exhibit a very good insecticidal effect and are effective either as contact poisons or as ingestive poisons. Furthermore, they exhibit satisfactory fungicidal and herbicidal properties. The superior effectiveness of the compounds of the present invention is confirmed by the following examples.

EXAMPLE A

Test on *Musca domestica*

Various dilutions are prepared by dissolving the effective agents to be examined in acetone. The highest concentration prepared is 0.2 mg. of effective agent per ml.; the lowest concentration prepared is 0.002 mg. per ml. One ml. of each solution is uniformly distributed on the surface of a petri dish having a diameter of 96 mm. and allowed to dry thereon. Then, seven-day-old houseflies (*Musca domestica*) are placed in the dish, and the dish is covered. After 24 hours, the percent mortality from duplicate experiments is determined, and the $LD_{50}$ is calculated therefrom as the amount of effective agent (measured in milligrams per 100 cm.$^2$) at which 50% of the insects were killed. The experimental results for several thioureas of Formula I are present in Table I.

TABLE I

*Musca domestica* Test

| Effective agent: | LD$_{50}$/24 hours (in milligrams/100 cm.$^2$) |
|---|---|
| N-(3-chlorophenyl)-N'-isobutyryl thiourea | 0.35 |
| N-(3-trifluoromethylphenyl)-N'-butyryl thiourea | 0.35 |
| N-(3-trifluoromethylphenyl)-N'-trimethylacetyl thiourea | 0.4 |
| N-(3-trifluoromethyl)-N'-isobutyryl thiourea | 0.002 |
| N-(3-trifluoromethyl-4-nitrophenyl)-N'-isobutyryl thiourea | 0.25 |

EXAMPLE B

Test on *Plutella maculipennis*

White cabbage leaves are immersed for 5 seconds in various aqueous dilutions prepared from emulsion concentrates of the effective agents being tested. After allowing the leaves to drip-dry, they are studded with seven-day-old larvae of the cabbage moth (*Plutella maculipennis*), and mortality is evaluated after three days. Table II presents the minimum concentrations of the effective agents at which 100% of the larvae was destroyed.

TABLE II

*Plutella maculipennis* Test

| Effective agent: | Minimum concentration of effective agent (wt. percent) for 100% mortality |
|---|---|
| N-3-(chlorophenyl)-N'-isobutyryl thiourea | 0.1 |
| N-(3-trifluoromethylphenyl)-N'-butyryl thiourea | 0.02 |
| N-(3-trifluoromethylphenyl)-N'-trimethylacetyl thiourea | 0.04 |
| N-(3-trifluoromethylphenyl)-N'-isobutyryl thiourea | 0.005 |
| N-(3-trifluoromethyl-4-nitrophenyl)-N'-isobutyryl thiourea | 0.1 |

Additional experiments established excellent insecticidal effectiveness of the compounds of Formula I on the following additional phytophagous or hygiene-endangering insect pests: roaches (Blattidae), including the oriental cockroach (*Blatta orientalis*); flies (Diptera), including the onion fly (*Phorbia antiqua*), cabbage fly (*Phorbia brassicae*) and fruit fly (*Drosophila melanogaster*); butterfly larvae (Lepidoptera), including the Egyptian bollworm [*Spodoptera littoralis* (Prodenia)]; hymenoptera (Hymenoptera), including the gooseberry sawfly (*Pteronus ribesii*), and the rape leaf wasp (*Athalia rosae*).

Optimal insecticdally effective amounts of the thioureas of this invention will vary according to the particular thiourea compound being used, the insect species being treated, the method of application, and environmental factors. Suitable dosages for a given application can readily be determined according to the above or other standard methods for measuring insecticidal activity. Rates of application suitable to effect insecticidal activity preferably range from 0.0005 to 1.0 mg. of effective agent per 100 cm.$^2$ area being treated, and more preferably from 0.001 to 0.5 mg./100 cm.$^2$.

These experiments also demonstrated the superiority of the thieourea effective agents of this invention over conventional pest control substances, e.g., 1-naphthyl-N-methylcarbamate, γ-hexachlorocyclohexane, or O,O-diethyl-O-[2-isopropyl-4-methyl-pyrimidinyl-(6)]-thionophosphate. The thiourea compounds of this invention are particularly effective against those insect populations which show a marked resistance against other pest control agents, such as, for example, the chlorinated hydrocarbons.

The fungicidal effectiveness of the thiourea effective agents of this invention was proven by spore germination tests on the fungi *Plasmopara viticola* and *Sphaerotheca fuliginea*, which are especially damaging pests in gardens and vineyards. In conducting this test, 2 drops (about 0.03 ml.) of variously concentrated acetone solutions of effective agent are uniformly distributed in the identations (having an area of about 2.25 cm.$^2$) of concave-ground object slides. After the solvent has evaporated, 2 drops of a suspension containing 25,000–50,000 spores of the test fungus per ml. are overlaid on the coatings of effective agent, and the slides are incubated for 24 hours in a moist chamber at 22° C. Thereafter, the germinated spores are counted under a microscope. From the percentages of the non-germinated spores at various concentrations of effective agent, LD$_{50}$ and LD$_{95}$ values are graphically determined. Fungicidal effectiveness of the thiourea according to this invention against strains of *Venturia inaequalis*, *Alternaria* spec., *Botrytis cinerea*, and *Cladosporium fulvum* was also established in the same manner.

Optimal fungicidally effective amounts of the thiourea of this invention will vary according to the particular thiourea compound being used, the fungus species being treated, the method of application, and environmental factors. Suitable dosages for a given application can readily be determined by the spore germination test or by other standard methods for measuring fungicidal activity. Application rates suitable for effecting fungicidal activity preferably range from 0.1 to 5.0 of effective agent per hectare being treated, and more preferably from 1.0 to 3.0 kg.

The herbicidal properties of the effective agents of this invention are demonstrated by the post-germination test on *Avena sativa* (oats), *Phaseolus vulgaris* (bean), *Cucumis melo* (melon), and *Echinochloa crus-galli* (millet). In conducting these tests, the test plants in the two- to three-leaf stage are sprayed dripping wet with solutions prepared by dissolving the effective agent in acetone, adding an emulsifier, and diluting with water to the desired concentration. The plants are then kept for 4 weeks in a greenhouse, after which time the condition of the test plants is evaluated and the minimum amount or concentration of effective agent at which the test plants are destroyed with certainty is determined.

Optimal herbicidally effective amounts of the thioureas of this application will vary according to the particular thiourea compounds being used, the plant species being treated, the method of application, and environmental factors. Suitable dosages for a given application can readily be determined by the post-germination test or other standard methods for measuring herbicidal activity. Application rates suitable for effecting herbicidal activity preferably range from 0.01 to 0.5 g. of effective agent per square meter being treated, and more preferably from 0.1 to 0.4 g. per square meter.

The effective agents of this invention can be processed together with all of the usual additives and carrier substances customary for formulating pest control agents. For example, they can be prepared as solutions or emulsion concentrates which can also be sprayed as aerosols, or as suspensions, dispersions, powders, pastes, jellies, granules and bait formulations.

The amount of effective agent in the above preparations is ordinarily at least 0.1 and less than 95% by weight, preferably at least 0.5 and less than 90% by weight. Bait formulations and granulated substances will contain, in most cases, between 1 and 10% by weight of effective agent, whereas solutions, emulsion concentrates, suspensions, and sprayable powders contain 5–95% by weight, preferably 20–90% by weight, of effective agent. The thioureas of Formula I can, of course, also be utilized in combination with other effective agents.

Compositions employing the agents of this invention may be formulated in a conventional manner, for example by mixing with solvents or solid carrier substances, optionally with the use of surfactants as wetting and emulsifying agents. Especially suitable solvents include liquid hydrocarbons, e.g., petroleum ether, cyclohexane, benzene, xylene, solvent naphtha (aromatic hydrocarbon mixtures with boiling points of between 150 and 180° C., petroleum, especially petroleum fractions having boiling points of between 80 and 200° C., tetrahydronaphthalene and decahydronaphthalene; aliphatic alcohols, e.g., methanol, ethanol, isopropanol, isobutanol, n-butanol, or hexanol; glycol ethers, e.g., methyl glycol and ethyl glycol; ketones, e.g., acetone, methyl ethyl ketone, diethyl ketone, methyl isobutyl ketone, isophorone, cyclohexanone and methylcyclohexanone; dioxane; dimethylformamide; N-methylpyrrolidone; dimethyl sulfoxide; acetonitrile; or mixtures of the above.

Emulsion concentrates can also be commercially prepared for subsequent dilution, e.g., with water, prior to use. When one or more of the effective agents is water-soluble, it is, of course, possible to use water as the solvent or diluent in preparing the concentrate.

Conventional pulverulent solid carrier substances and fillers include, for example: bole, kaolin, siliceous chalk (naturally occurring mineral, consisting of kaolinite and quartz), bentonite, ground shale, pyrophyllite, talc, montmorillonite, chalk, dolomite, mica, silicic acid, aluminum silicate or calcium silicate, kieselguhr, or ground walnut hulls. As wetting agents and emulsifiers, anionic, cationic or nonionic surface-active substances may be used, depending on the purpose for which the preparations are to be used. Suitable wetting agents and emulsifiers include soaps, e.g., sodium laurate; alkyl sulfates or sulfonates, e.g., sodium dodecyl sulfate or sulfonate; sulfonated and sulfated ethers; sulfonated alkyl fatty acid esters; sulfonated glycol fatty acid esters; quaternary ammonium salts, e.g., trimethylammonium iodide; amines and amides with a long aliphatic chain; monoethers of polyglycols with long-chain aliphatic alcohols, e.g., the reaction products of ethylene oxide or polyethylene glycol with higher aliphatic alcohols; monoesters of polyglycols with fatty acids, e.g., oleic acid; monoethers of polyglycols with alkylated phenols; partially esterified polyhydric alcohols, e.g., sorbitan trioleate; partially or completely esterified polyglycol ethers of polyhydric alcohols, e.g., the stearic acid triester of the polyglycol ether of sorbitan.

The thiourea pest control agents of this invention also can be formulated with binders and dispersing agents, such as cellulose and the derivatives thereof, e.g., methyl-, ethyl-, hydroxypropyl-, or carboxymethylcellulose; tragacanth; pectins; gum arabic; sulfite waste liquor powder; or lignin.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, the temperatures are set forth in degrees centigrade.

EXAMPLE 1

Under continuous agitation, a solution of 65. g. of freshly distilled isobutyryl mustard oil (B.P.$_{19}$: 61–63°) and 80 g. of 3-trifluoromethylaniline in 500 ml. of benzene is heated under reflux to the boiling point for 30 minutes. Thereafter, benzene is distilled off at 60° under reduced pressure until the onset of crystallization. The residue is cooled to 10°, and the thus-precipitated N-(3-trifluoromethylphenyl)-N'-isobutyryl thiourea is filtered; the colorless-crystalline material melts, after recrystallization from benzene, at 127–129°.

Analogously, the following compounds are obtained:

N-(3-trifluoromethylphenyl)-N'-acetyl thiourea, M.P. 95–97°;
N-(3-trifluoromethylphenyl)-N'-propionyl thiourea, M.P. 106–108°;
N-(3-trifluoromethylphenyl)-N'-butyryl thiourea, M.P. 89–91°;
N-(3-trifluoromethylphenyl)-N'-trimethylacetyl thiourea, M.P. 93–95°;
N-(3-trifluoromethyl-4-nitrophenyl)-N'-isobutyryl thiourea, M.P. 143–145°;
N-(3-trifluoromethyl - 4 - nitrophenyl)-N'-trimethylacetyl thiourea, yellowish oil which decomposes during attempts at distillation while assuming a brown and black coloration; soluble in acetone and in chloroform.

Analysis.—Calcd. for: $C_{10}H_{12}N_2OS_2$ (230.3) (percent): C, 44.70; H, 4.04; N, 12.03; F, 16.32. Found (percent): C, 44.9; H, 3.8; N, 11.7; F, 17.0.

N-(3-trifluoromethyl-2-chlorophenyl)-N'-isobutyryl thiourea, M.P. 140–142°;
N-(3-methylmercaptophenyl)-N'-acetyl thiourea, yellowish oil.

Analysis.—Calcd. for: $C_{10}H_{12}N_2OS_2$ (230.3) (percent): C, 52.15; H, 5.25; N, 12.16; S, 27.84. Found (percent): C, 52.6; H, 5.4; N, 11.8; S, 28.1.

N-(3-methylsulfinylphenyl)-N'-acetyl thiourea;
N-(3-methylsulfonylphenyl)-N'-acetyl thiourea;
N-(3-methylsulfonylphenyl)-N'-isobutyryl thiourea;
N-(3-ethylsulfonylphenyl)-N'-isobutyryl thiourea;
N-(3-isopropylsulfonylphenyl)-N'-isobutyryl thiourea;
N-(3-chlorophenyl)-N'-isobutyryl thiourea, M.P. 128–130°;
N-(3-fluorophenyl)-N'-isobutyryl thiourea, M.P. 94–96°;
N-(3-fluorophenyl)-N'-trimethylacetyl thiourea, M.P. 99–101°;
N-(3-bromophenyl)-N'-isobutyryl thiourea, M.P. 121–123°;
N-(3-iodophenyl)-N'-isobutyryl thiourea, M.P. 151–153°;
N-(3-cyanophenyl)-N'-isobutyryl thiourea, M.P. 137–139°;
N-(3-trichloromethylphenyl)-N'-acetyl thiourea;
N-(3-trichloromethylphenyl)-N'-propionyl thiourea;
N-(3-trichloromethylphenyl)-N'-butyryl thiourea;
N-(3-trichloromethylphenyl)-N'-isobutyryl thiourea;
N-(3-trichloromethylphenyl)-N'-trimethylacetyl thiourea;
N-(3-trichloromethyl-4-nitrophenyl)-N'-isobutyryl thiourea.

EXAMPLE 2

110 g. of N-(3-trifluoromethylphenyl) thiourea is heated with 300 ml. of acetic anhydride for 10 minutes to the boiling point. The reaction mixture is cooled to room temperature and poured, under stirring, into 2 l. of ice water. After one hour of agitation, the thus-separated N-(3-trifluoromethylphenyl)-N'-acetyl thiourea is filtered and recrystallized from benzene/hexane (50:50); M.P. 95–97°.

Analogously, with the use of propionic anhydride, N-(3-trifluoromethylphenyl)-N'-propionyl thiourea, M.P. 106–108°, is produced, and with the use of butyric anhydride, N-(3-trifluoromethylphenyl)-N'-butyryl thiourea is obtained, M.P. 89–91°.

EXAMPLE 3

22 g. of N-(3-trifluoromethylphenyl) thiourea in 200 ml. of pyridine is mixed dropwise with 12 g. of isobutyryl chloride under agitation. Then, the reaction mixture is heated in a water bath under stirring for 1 hour to 80°, and thereafter the residual pyridine is distilled off under reduced pressure. The remainder is stirred into 1 l. of ice water. The thus-precipitated, fine-crystalline N-(3-trifluoromethylphenyl)-N'-isobutyryl thiourea is filtered, washed with water and a small amount of cold alcohol, and dried; M.P. 125–126°.

EXAMPLE 4

22 g. of isobutyric acid amide and 30 g. of thiophosgene are refluxed under agitation in a water bath for 30 minutes. Subsequently, 60 g. of 3-aminobenzonitrile is added thereto and the mixture heated for 4 hours to 120°. The cooled reaction mixture is taken up in 250 ml. of acetone, and the thus-obtained suspension is poured into 1.5 l. of ice water. The thus-precipitated N-(3-cyanophenyl)-N'-isobutyryl thiourea is filtered and recrystallized from benzene; M.P. 135–138°.

EXAMPLE 5

Emulsion concentrate

|  | Percent |
|---|---|
| N-(3-trifluoromethylphenyl)-N'-isobutyryl thiourea | 40 |
| Dimethylformamide | 15 |
| Xylene | 40 |
| Emulsifier mixture (calcium dodecylbenzenesulfonate and polyoxyethylene sorbitan esters of a mixture of fatty acids and rosin acids) | 5 |

EXAMPLE 6

Sprayable powder

|  | Percent |
|---|---|
| N-(3-ethylsulfonylphenyl)-N'-butyryl thiourea | 35 |
| Silicic acid | 55 |
| Oleic acid N-methyltauride | 8 |
| Alkyl naphthalenesulfonate | 2 |

EXAMPLE 7

Granules

|  | Percent |
|---|---|
| N - (3 - trifluoromethyl-4-nitrophenyl)-N'-isobutyryl thiourea | 5 |
| Gelatin | 8 |
| Bole | 10 |
| Wheat flour | 5 |
| Bran | 72 |

EXAMPLE 8

Scatter bait

|  | Percent |
|---|---|
| N-(3-cyanophenyl)-N'-valeroyl thiourea | 3 |
| Talc | 12 |
| Cane sugar | 3 |
| Bran | 82 |

EXAMPLE 9

Emulsion concentrate

|  | Percent |
|---|---|
| N-(3-chlorophenyl)-N'-isobutyryl thiourea | 25 |
| Benzene | 70 |
| Emulsifier mixture (nonylphenol polyglycol ether and sodium alkyl sulfate) | 5 |

EXAMPLE 10

Emulsion concentrate

|  | Percent |
|---|---|
| N-(3-bromophenyl)-N'-isobutyryl thiourea | 20 |
| Xylene | 60 |
| Dimethyl sulfoxide | 10 |
| Sulfite waste liquor powder | 8 |
| Sodium dialkyl naphthalenesulfonate | 2 |

EXAMPLE 11

Aerosol preparation

|  | Percent |
|---|---|
| N - (3 - trifluoromethylphenyl) - N' - isobutyryl thiourea | 5 |
| Highly viscous collodion cotton | 0.5 |
| Aromatous substance | 0.5 |
| Dichloromethane | 94 |

This solution is filled into an aerosol spray can, together with the same amount of a propellant gas mixture of 50% dichlorodifluoromethane, 25% trichlorofluoromethane, and 25% technical propane-butane mixture (liquid gas).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Thioureas of the general formula

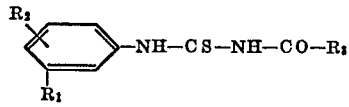

wherein $R_1$ is $CF_3$ or $CCl_3$, $R_2$ is H, halogen or $NO_2$, and $R_3$ is alkyl or 1–6 carbon atoms.

2. Thioureas according to claim 1 wherein $R_2$ is halogen or $NO_2$ in the 2- or 4-position of the phenyl nucleus.

3. Thioureas according to claim 1 wherein $R_3$ is isopropyl or t-butyl.

4. Thioureas according to claim 2 wherein $R_3$ is isopropyl or t-butyl.

5. A compound of claim 1, N-(3-trifluoromethylphenyl)-N'-acetyl thiourea.

6. A compound of claim 1, N-(3-trifluoromethylphenyl)-N'-propionyl thiourea.

7. A compound of claim 1, N-(3-trifluoromethylphenyl)-N'-butyryl thiourea.

8. A compound of claim 1, N-(3-trifluoromethylphenyl)-N'-isobutyryl thiourea.

9. A compound of claim 1, N-(3-trifluoromethylphenyl)-N'-trimethylacetyl thiourea.

10. A compound of claim 1, N-(3-trifluoromethyl-4-nitrophenyl)-N'-isobutyryl thiourea.

11. A compound of claim 1, N-(3-trifluoromethyl-4-nitrophenyl)-N'-trimethylacetyl thiourea.

12. A compound of claim 1, N-(3-trifluoromethyl-2-chlorophenyl)-N'-isobutyryl thiourea.

13. A compound of claim 1, N-(3-trichloromethyl-N'-acetyl thiourea.

14. A compound of claim 1, N-(3-trichloromethylphenyl)-N'-propionyl thiourea.

15. A compound of claim 1, N-(3-trichloromethylphenyl)-N'-butyryl thiourea.

16. A compound of claim 1, N-(3-trichloromethylphenyl)-N'-isobutyryl thiourea.

17. A compound of claim 1, N-(3-trichloromethylphenyl)-N'-trimethylacetyl thiourea.

18. A compound of claim 1, N-(3-trichloromethyl-4-nitrophenyl)-N'-isobutyryl thiourea.

References Cited

FOREIGN PATENTS

| 1,230,011 | 12/1966 | Germany | 260—552 |
|---|---|---|---|
| 685,123 | 3/1930 | France. | |

OTHER REFERENCES

Schröpl et al., Pharmazie, vol, 23, pp. 484–90 (1968).

LEON ZITVER, Primary Examiner

M. W. GLYNN, Assistant Examiner

U.S. Cl. XR

71—99; 260—465 R; 424—322